MODULATION SYSTEM

Filed Jan. 29, 1964

INVENTOR.
MERLE V. HOOVER
BY
George T. Craig
Attorney

United States Patent Office 3,274,518
Patented Sept. 20, 1966

3,274,518
MODULATION SYSTEM

Merle V. Hoover, Lancaster, Pa., assignor to Radio Corporation of America, a corporation of Delaware Filed Jan. 29, 1964, Ser. No. 340,882
9 Claims. (Cl. 332—60)

The present invention relates to amplitude modulation systems.

An object of the present invention is to provide in a novel manner for effecting amplitude modulation of a carrier wave.

Another object of the present invention is to provide a novel modulation system in which a radio-frequency (R-F) amplifier stage is modulated in a linear manner combined with plate modulation.

A further object of the present invention is to provide a novel modulation system which does not require a high level modulation transformer.

In conventional high power AM transmitters employing anode modulation, the modulation transformer is of considerable cost, size and weight. The present invention provides a high power amplitude modulation system wherein a high power modulation transformer is not required.

In accordance with one embodiment of the present invention a vacuum tube is biased to operate as a Class B R-F linear power amplifier. A modulated carrier is fed to the grid of the tube. When the carrier is unmodulated the amplifier develops carrier power efficiently and supplies it to a load, for example, an antenna. Plate voltage for operation of the amplifier under unmodulated carrier conditions is supplied from a first power supply by way of a diode. Assuming application of the carrier modulated by an audio frequency waveform, when the carrier amplitude exceeds its unmodulated amplitude, plate modulation is provided by a Class B linear audio amplifier whose input is the audio frequency modulating signal. The audio amplifier is in series between the first power supply and a second power supply. During the time when the carrier envelope amplitude exceeds the unmodulated carrier amplitude, the audio amplifier modulates the plate current of the driven R-F amplifier. Also, the diode interrupts the path fro mthe first power supply leaving both power supplies effectively in series. When the amplitude of the modulated carrier envelope is less than the unmodulated carrier amplitude the R-F amplifier acts as a linear amplifier and the audio amplifier is biased to be cut-off and becomes idle.

Figure 1:
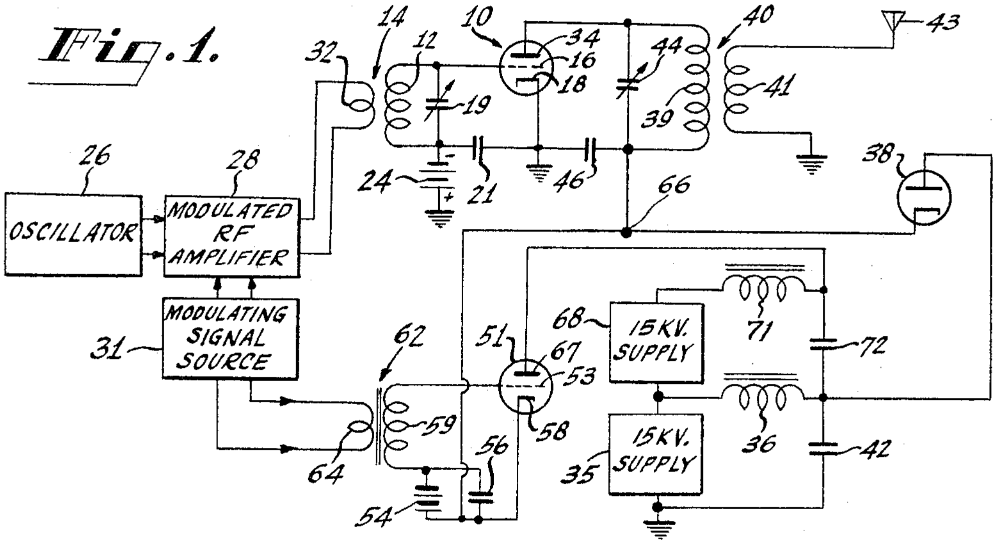
Figure 2:
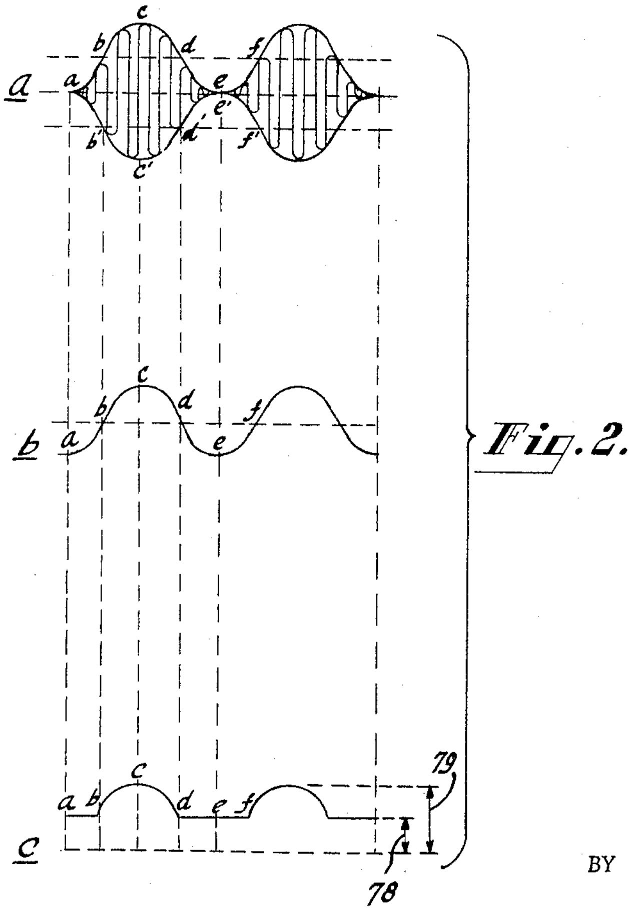

The invention will be described in greater detail by reference to the accompanying drawing in which:

FIGURE 1 is a schematic diagram of a modulator embodying the present invention; and FIGURE 2, comprising FIGURES 2*a*, 2*b*, and 2*c*, shows waveforms referred to in explaining operation of the modulator of FIGURE 1.

Referring to FIGURE 1 of the drawing, the input circuit of tube 10 includes the secondary 12 of an R-F transformer 14 one end of which is connected to the control electrode or grid 16 of the tube and the other end of which is connected to the cathode 18 by way of a coupling capacitor 21. A tuning capacitor 19 tunes the resonant circuit including secondary 12 and capacitor 19 to approximately the frequency of the carrier to be amplified and modulated. The resonant circuit accepts the carrier and its sidebands. The cathode 18 is also connected to a voltage reference point in the oscillator, ground for example. A fixed bias is applied to the grid 16 from a bias source 24 shown for convenience as a battery. The bias may be derived from any suitable power supply. The voltage value of this bias is selected so that the tube 10 operates as a Class B R-F power amplifier and is responsive only to positive-going excursions of the carrier signal from its alternating current axis.

The carrier of a desired or selected frequency, generated by an oscillator 26 is modulted in an R-F amplifier stage 28 by a modulating signal originated by a modulating signal source 31. The oscillator 26 and modulated R-F amplifier 28 may be any known type and need no further explanation. The modulating signal source 31 may, for example, be a source of program material or any other material for broadcast purposes, or the like. The output of the modulated R-F amplifier 28, which may be shown by FIGURE 2*a*, is fed to the primary 32 of the transformer 14.

The positive terminal of a first power supply source 35 is connected to the anode or plate 34 of the tube 10 by way of a filter choke 36, a diode 38 and the primary 39 of an R-F coupling transformer 40. The diode 38 is shown by way of example as a thermionic diode, but may be any unilaterally conductive device as, for example, a semiconductor diode. A filter capacitor 42 shunts the power supply 34 to provide a smoothing filter in the usual manner. The secondary 41 of the transformer 40 feeds a load, such as the antenna 43.

A tuning capacitor 44 tunes the resonant circuit comprising the primary 39 and capacitor 44 to approximately the frequency of the carrier which has been amplified and modulated. This resonant circuit and the resonant circuit comprising secondary 12 and capacitor 19 are sufficiently broad in bandwidth to accommodate the carrier and its sidebands. A coupling capacitor 46 completes the R-F circuit from the anode 34 to ground. The portion of the modulator so far described including the anode circuit comprising diode 38 and the first power supply 35 serves to linearly amplify the modulated R-F carrier below a preselected or predetermined amplitude level. This level may conveniently be the amplitude of the unmodulated output of the R-F amplifier 28 as will be pointed out in more detail in connection with FIGURE 2.

A tube 51 serves as a Class B linear audio amplifier excited by the waveform shown in FIGURE 2*b*. The tube 51 is biased to cut-off at the line *b*, *d*, *f*, in FIGURE 2*b* by a fixed bias applied to the grid 53 from a bias source 54, which may be a battery as shown bypassed by a capacitor 56, or obtained by known means from a power supply. The grid 53 of the tube 51 is connected to the cathode 58 by way of the secondary 59 of an audio transformer 62 and the biasing battery 54. The cathode-grid circuit of the tube 51 is isolated from ground. The modulating signal of FIGURE 2*b* is applied to the primary 64 of the audio transformer 62 from the modulating signal source 31.

The cathode 58 of the tube 51 is connected to the supply circuit for the anode of the tube 10 at a terminal 66 of the connection between the primary 39 and the cathode of the diode 38. The anode 67 of the tube 51 is connected to a second power supply 68 for the R-F amplifier tube 10. A filter choke 71 and capacitor 72 provide a ripple smoothing effect, in addition to that of the choke 36 and capacitor 42. In this connection, power supplies 35 and 68 operate together to provide the plate current supply for the tube 10 during upward modulation. At this time, the diode 38 becomes inoperative and the voltage at the terminal 66 is approximately the sum of the voltages of the power supplies 35 and 68, neglecting the voltage drop across the tube 51.

Operation of the illustrative embodiment of applicant's invention in FIGURE 1 will now be described by reference to the curves of FIGURE 2. A carrier modulated by the signal of FIGURE 2*b*, for example from the modulated R-F amplifier 28, appears across the primary 32 of the R-F transformer to excite the grid 16 of the tube 10.

In FIGURE 2*a* when the unmodulated carrier level is *bb'* plate power for the tube 10 is supplied from the power supply 35 by way of the diode 38. The tube 51 is biased to cut-off by the bias source 54 and the amplitude of the modulation signal (FIGURE 2*b*) is zero. With the unmodulated driving signal *bb'*, the R-F amplifier circuitry develops carrier power efficiently and radiates it from the antenna 43.

Assuming, for example, a voltage of 15 kilovolts (kv.) for the power supply 35 and neglecting the voltage drop across the diode 38, the plate supply voltage to the R-F amplifier tube will be approximately 15 kv. This voltage applied at the terminal 66 is represented in amplitude at 78 (FIGURE 2*c*). With the envelope of FIGURE 2*a* the modulation crest is *bcd* and the modulation trough *def*.

For upward modulation, the R-F amplifier is driven by cresting portion of the waveform *bcd*. Simultaneously, since plate modulation is to be accomplished, the plate voltage at the terminal 66 is instantaneously modulated upwardly over that portion of the cycle designated as *bcd* (FIGURE 2*a*). This is accomplished by the Class B linear audio amplifier tube 51 acting as a modulator excited by the waveform of FIGURE 2*b* and being driven in an upward direction by the portion *bcd*.

Assuming, for example, a voltage also of 15 kv. for the power supply 68, the instantaneous voltage at the terminal 66 as the upward crest of the modulating voltage approaches 30 kv. as indicated at 79 on FIGURE 2*b*. The voltage drop across the tube 51 is neglected since its magnitude is as a practical matter small compared to the total. The diode 38 is inoperative as the tube 51 conducts and the voltage developed at the cathode 58 of the tube 51 exceeds approximately 15 kv. At the crest of upward modulation the diode is subjected to an inverse voltage approaching 15 kv. The tube 51 is biased to be virtually cut off at point *d* on the modulating signal waveform of FIGURE 2*b*.

Throughout the cycle *def* (FIGURE 2*b*) the tube 51 is biased beyond cut-off (i.e., to be cut-off). For downward modulation the R-F amplifier 10 is operated with a plate voltage at terminal 66 in the order of 15 kv. with the tube 51 biased to be cut-off. Downward modulation is accomplished as the envelope of FIGURE 2*a* traverses its trough *def* and linearly drives the R-F amplifier 10 in direct relation to the driving voltage amplitude until the modulation waveform again reaches the carrier condition *f*.

What is claimed is:

1. An amplitude modulation system for a modulated carrier wave and a modulation signal, comprising,
   an R-F amplifier,
   means to couple said modulated carrier wave to said R-F amplifier for amplification of said modulated carrier wave,
   a modulation amplifier for amplifying said modulation signal,
   means to bias said modulation amplifier to cut-off below a predetermined modulation signal amplitude, and
   means coupling said modulation amplifier to said R-F amplifier to control the amplification of said R-F amplifier at modulation signal amplitudes in excess of said predetermined modulating signal amplitude.

2. An amplitude modulation system comprising,
   a carrier wave source,
   means for modulating said carrier wave by a modulating signal,
   an R-F amplifier,
   means to couple said modulating means to said R-F amplifier for amplification of said modulated carrier wave,
   an audio amplifier, means to supply said modulating signal to said audio amplifier,
   means to bias said audio amplifier to cut-off below a predetermined modulating signal amplitude,
   first and second means to provide an output bias for said R-F amplifier,
      said second biasing means providing bias to said R-F amplifier in series with said audio amplifier whereby said audio amplifier modulates said R-F amplifier when said modulating signal exceeds said predetermined amplitude.

3. An amplitude modulation system comprising,
   a carrier wave source,
   a source of modulating signals,
   means for modulating said carrier wave by a modulating signal from said source of modulating signals,
   an R-F amplifier,
   means to couple said modulating means to said R-F amplifier,
   means to bias said R-F amplifier to be responsive only to positive-going excursions of the carrier signal from its alternating current axis,
   an audio amplifier,
   means to supply said modulating signal to said audio amplifier,
   means to bias said audio amplifier to cut-off below a predetermined modulating signal amplitude, and
   means whereby said audio amplifier controls amplification of said R-F amplifier at modulating signal amplitudes in excess of said predetermined amplitude.

4. An amplitude modulation system comprising,
   a carrier wave source,
   a source of modulating signals,
   means for modulating said carrier wave by a modulating signal from said source of modulating signals,
   an R-F amplifier,
   means to couple said modulating means to said R-F amplifier,
   means to bias said R-F amplifier to be responsive only to positive-going excursions of the carrier signal from its alternating current axis,
   an audio amplifier,
   means to supply said modulating signal to said audio amplifier,
   means to bias said audio amplifier to cut-off below a predetermined modulating signal amplitude,
   means to provide an output operating bias to said R-F amplifier,
   a second means to provide an output operating bias to said R-F amplifier, and
   means including said audio amplifier to control application of output bias from both said first and second means to provide an output bias during existence of modulating signal amplitudes in excess of said predetermined modulating signal amplitude.

5. An amplitude modulation system comprising,
   a carrier wave source,
   a source of modulating signals,
   means for modulating said carrier wave by a modulating signal from said source of modulating signals,
   an R-F amplifier,
   means to couple said modulating means to said R-F amplifier,
   means to bias said R-F amplifier to be responsive only to positive-going excursions of the carrier signal from its alternating current axis,
   an audio amplifier,
   means to supply said modulating signal to said audio amplifier,
   means to bias said audio amplifier to cut-off below a predetermined modulating signal amplitude,
   means to provide an output operating bias to said amplifier,
   a second means to provide an output operating bias to said amplifier, and means including said means to bias said audio amplifier to cut-off whereby said audio amplifier controls application of output bias to said R-F amplifier from said second means to provide output operating bias at modulating signal amplitudes in excess of said predetermined modulating signal amplitude.

6. An amplitude modulation system comprising,
a carrier wave source,
a source of modulating signals,
means for modulating said carrier wave by a modulating signal from said source of modulating signals,
an R-F amplifier,
means to couple said modulating means to said R-F amplifier,
means to bias said R-F amplifier to be responsive only to positive-going excursions of the carrier signal from its alternating current axis,
an audio amplifier,
means to supply said modulating signal to said audio amplifier,
means to bias said audio amplifier to cut-off below a predetermined modulating signal amplitude,
means to provide an output operating bias to said R-F amplifier,
a second means to provide an output operating bias to said R-F amplifier,
a diode, and
means including said audio amplifier and said diode to control application of output bias from both said first and second means to provide an output bias during existence of modulating signal amplitudes in excess of said predetermined modulating signal amplitude.

7. An amplitude modulation system comprising,
a carrier wave source,
a source of modulating signals,
means for modulating said carrier wave by a modulating signal from said source of modulating signals,
an R-F amplifier having an input circuit and an output circuit,
means to couple said modulating means to said input circuit,
means to bias said R-F amplifier to be responsive only to positive-going excursions of the carrier signal from its alternating current axis,
an audio amplifier,
means to supply said modulating signal to said audio amplifier,
means to bias said audio amplifier to cut-off below a predetermined modulating signal amplitude,
means to provide an output operating bias to said R-F amplifier,
a second means to provide an output operating bias to said R-F amplifier,
a diode, and
means including said audio amplifier and said diode in said R-F amplifier output circuit to control application of output bias from both said first and second means to provide an output bias during existence of modulating signal amplitudes in excess of said predetermined modulating amplitude.

8. An amplitude modulation system comprising,
a carrier wave source,
a source of modulating signals,
means for modulating said carrier wave by a modulating signal from said source of modulating signals,
an R-F amplifier having a cathode, anode and a control electrode,
means to bias said control electrode to cut-off said amplifier on negative-going excursions of the carrier signal from its alternating current axis,
means to couple said means for modulating said carrier wave to said control electrode,
an audio amplifier having a cathode, anode and a control electrode,
means to couple said source of modulating signals between said audio amplifier control electrode and cathode,
means to bias said audio amplifier control electrode to cut-off said audio amplifier below a predetermined modulating signal amplitude,
a power supply source for said anode of said R-F amplifier, a diode having a cathode and anode,
circuit means connecting said power supply source between said diode anode and a point of reference potential for said modulation system,
a connection including a terminal and R-F amplifier output means from said diode cathode to said anode of said R-F amplifier,
a second power supply source,
circuit means connecting said second power supply source to said first power supply source and said anode of said audio amplifier, and
circuit means connecting said cathode of said audio amplifier to said terminal.

9. An amplitude modulation system for a source of modulated carrier wave and modulation signals comprising,
an R-F amplifier,
means to couple said modulated carrier wave signals to said R-F amplifier for amplification of said signals,
a modulation amplifier,
means to supply said modulation signals to said modulation amplifier,
means to bias said modulation amplifier to cut-off below a predetermined modulating signal amplitude, and
means including said modulation amplifier for controlling the amplification of said R-F amplifier at modulating signal amplitudes in excess of said predetermined modulating signal amplitude.

References Cited by the Examiner

UNITED STATES PATENTS 2,285,164 6/1942 Kummerer -------- 332—60 X

ROY LAKE, *Primary Examiner.*

A. L. BRODY, *Assistant Examiner.*